US010049389B2

(12) United States Patent
Rider et al.

(10) Patent No.: US 10,049,389 B2
(45) Date of Patent: Aug. 14, 2018

(54) SYSTEM AND METHOD FOR INTERACTING WITH DIGITAL SIGNAGE

(71) Applicant: Intel Corporation, Santa Clara, CA (US)

(72) Inventors: Tomer Rider, Naahryia (IL); Shahar Taite, Kfar Saba (IL); Igor Ljubuncic, Chiswick London (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/436,220

(22) Filed: Feb. 17, 2017

(65) Prior Publication Data
US 2017/0228788 A1    Aug. 10, 2017

Related U.S. Application Data

(63) Continuation of application No. 14/579,909, filed on Dec. 22, 2014, now Pat. No. 9,607,515.

(51) Int. Cl.
| | |
|---|---|
| G08G 1/09 | (2006.01) |
| G06Q 30/02 | (2012.01) |
| H04W 4/02 | (2018.01) |
| G08G 1/0967 | (2006.01) |
| G06F 3/01 | (2006.01) |

(52) U.S. Cl.
CPC ..... *G06Q 30/0266* (2013.01); *G06Q 30/0265* (2013.01); *G08G 1/096783* (2013.01); *H04W 4/02* (2013.01); *G06F 3/017* (2013.01)

(58) Field of Classification Search
CPC ............ G06Q 30/0266; G06Q 30/0265; G06F 3/017; G08G 1/096783; H04W 4/02

USPC ......................................................... 340/905
See application file for complete search history.

(56) References Cited

U.S. PATENT DOCUMENTS

| | | | |
|---|---|---|---|
| 5,214,793 A | 5/1993 | Conway et al. | |
| 5,848,129 A * | 12/1998 | Baker .................. | G08G 1/0962 |
| | | | 348/383 |
| 6,252,522 B1 * | 6/2001 | Hampton .................. | G09F 9/00 |
| | | | 340/905 |
| 7,015,875 B2 * | 3/2006 | Wampler ............... | G06Q 30/02 |
| | | | 345/2.1 |

(Continued)

FOREIGN PATENT DOCUMENTS

| | | |
|---|---|---|
| WO | WO-2014172313 A2 | 10/2014 |
| WO | WO-2016105900 A1 | 6/2016 |

OTHER PUBLICATIONS

"International Application Serial No. PCT/US2015/063738, International Preliminary Report on Patentability dated Jul. 6, 2017", 9 pgs.

(Continued)

*Primary Examiner* — John A Tweel, Jr.
(74) *Attorney, Agent, or Firm* — Schwegman Lundberg & Woessner, P.A.

(57) ABSTRACT

Various systems and methods for interaction with digital signage are described herein. A system for interacting with digital signage, includes an identification module to identify, at an onboard system in a vehicle, a first roadside digital signage, the first roadside digital signage having first content; a communication module to receive a first option to perform a first action related to the first content; and a presentation module to display the first option via the onboard system.

23 Claims, 6 Drawing Sheets

(56) References Cited

U.S. PATENT DOCUMENTS

| | | |
|---|---|---|
| 7,620,026 B2 | 11/2009 | Anschutz et al. |
| 8,254,338 B2 | 8/2012 | Anschutz et al. |
| 8,437,776 B2 | 5/2013 | Busch |
| 9,607,515 B2 | 3/2017 | Rider et al. |
| 2004/0098191 A1 | 5/2004 | Becker et al. |
| 2014/0344062 A1 | 11/2014 | Lamont |
| 2014/0347268 A1 | 11/2014 | Khosravy et al. |
| 2015/0006278 A1 | 1/2015 | Di Censo et al. |
| 2015/0254720 A1 | 9/2015 | Newberg et al. |
| 2015/0294347 A1 | 10/2015 | Placide |
| 2016/0180709 A1 | 6/2016 | Rider et al. |

OTHER PUBLICATIONS

"U.S. Appl. No. 14/579,909, Non Final Office Action dated Apr. 27, 2016", 11 pgs.

"U.S. Appl. No. 14/579,909, Notice of Allowance dated Nov. 16, 2016", 8 pgs.

"U.S. Appl. No. 14/579,909, Response filed Aug. 26, 2016 to Non Final Office Action dated Apr. 27, 2016", 11 pgs.

"International Application Serial No. PCT/US2015/063738, International Search Report dated Mar. 28, 2016", 6 pgs.

"International Application Serial No. PCT/US2015/063738, Written Opinion dated Mar. 28, 2016", 7 pgs.

\* cited by examiner

SYSTEM AND METHOD FOR INTERACTING WITH DIGITAL SIGNAGE

This application is a continuation of U.S. patent application Ser. No. 14/579,909, filed on Dec. 22, 2014, which is incorporated herein by reference in its entirety.

TECHNICAL FIELD

Embodiments described herein generally relate to wireless communications and in particular, to systems and methods for interacting with digital signage.

BACKGROUND

Conventional roadside advertising includes large format signs, billboards, paintings or graphics on buildings, light displays, and yard signs. Roadside advertisements may be viewed by large numbers of pedestrians and drivers.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The systems and processes described herein generally relate to systems and methods for interacting with digital signage. Digital signage may include billboards or signs with projected images, video, or multimedia. As a person drives around, she may pass several roadside digital signs or billboards. It may be difficult to operate the vehicle and jot down notes about those billboards that are interesting. Instead, mechanisms are described in this document that provide an easy way to interact with digital or electronic billboards and signage.

Figure 1:
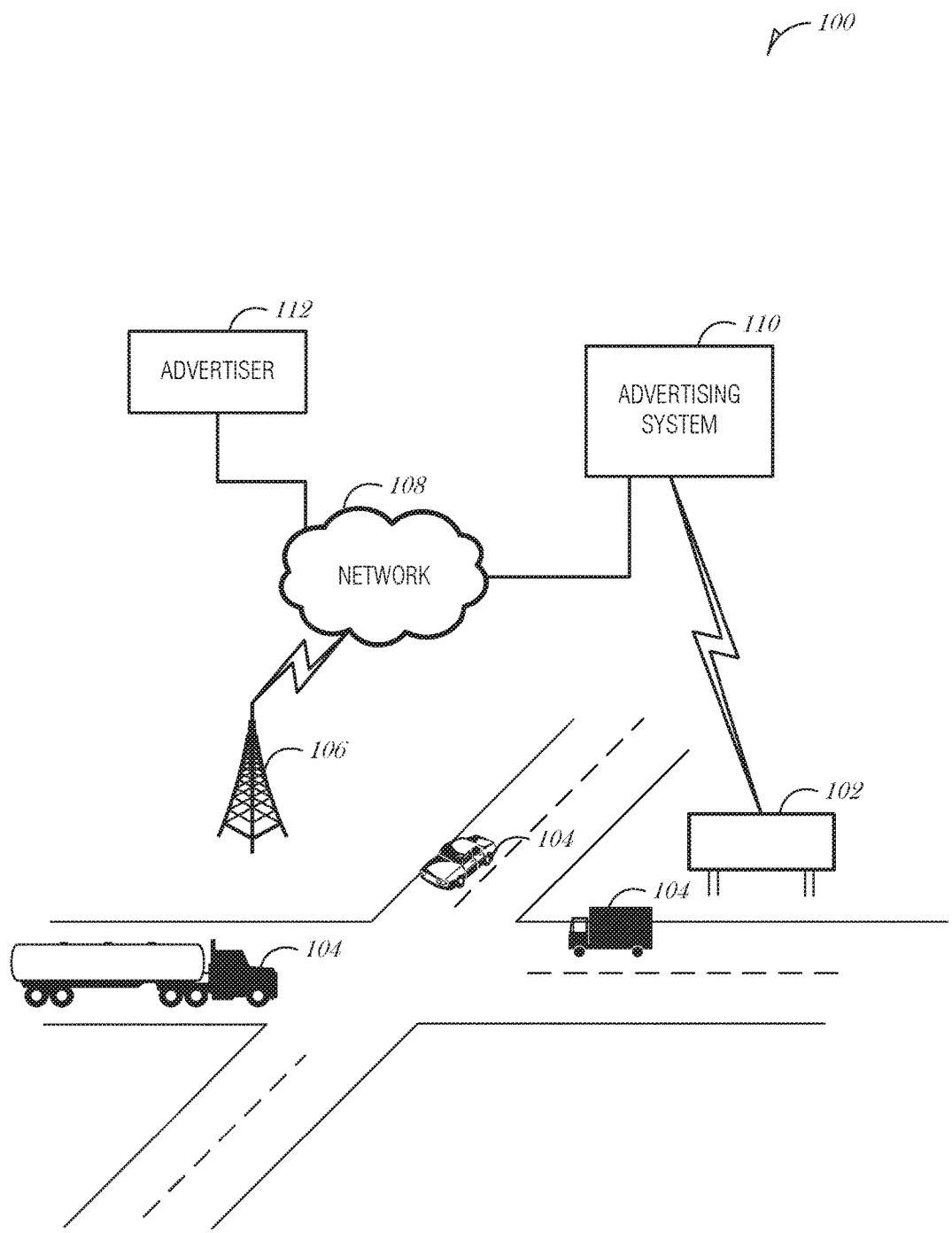
FIG. 1 is a diagram illustrating a system to provide interactive digital signage, according to an embodiment

FIG. 1 is a diagram illustrating a system 100 to provide interactive digital signage, according to an embodiment. An outdoor advertising apparatus 102 is provided. In the example illustrated in FIG. 1, the outdoor advertising apparatus 102 is a billboard. It is understood that the outdoor advertising apparatus 102 may be various types of electronic displays, including but not limited to digital billboards, projection display systems, light-emitting diode displays, television displays, and the like. It is also understood that the outdoor advertising apparatus 102 may be a non-electronic billboard, such as a large-format print or painting, with wireless communication capabilities. The outdoor advertising apparatus 102 is configured to display one or more advertisements to pedestrian or vehicle traffic. The vehicle traffic may include one or more vehicles 104.

A monitoring station 106 may capture video or photographs of the vehicle traffic. The monitoring station 106 may be equipped with various sensors such as a camera, barometer, moisture sensor, clock, and the like to capture various environmental data. The monitoring station 106 may also be equipped with short and/or long-range telemetry equipment, such as a radio, to communicate over short or long-range telemetry. The monitoring station 106 may transmit or receive information from a network 108 over short-range or long-range telemetry. Monitoring stations 106 may be incorporated into a billboard or other outdoor advertising apparatus 102.

The network 108 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 108 may include a single local area network (LAN) or wide-area network (WAN), or combinations of LANs or WANs, such as the Internet. The various devices (e.g., monitoring station 106 or vehicle 104) may be coupled to the network 108 via one or more wired or wireless connections.

An advertising system 110 may be connected to the network 108 and receive data from the monitoring station 106 or the outdoor advertising apparatus 102. The data may be unprocessed images or video recorded by the monitoring station 106 or outdoor advertising apparatus 102. Alternatively, the data may be partially or fully processed by the monitoring station 106 or outdoor advertising apparatus 102. The advertising system 110 may collect the unprocessed or processed data from the monitoring station 106 or the outdoor advertising apparatus 102 and analyze it further. An advertiser 112 may access the advertising system 110 via a website hosted by the advertising system 110 or an affiliate system (not shown). The web interface may provide the advertiser 112 analytics on the outdoor advertising apparatus 102. Using such analytics, the advertiser 112 may identify an advertising theme, an advertisement, a particular outdoor advertising apparatus 102, or a particular timeframe to present an advertisement. In general, the advertiser 112 is able to target market more effectively.

As a driver approaches an outdoor advertising apparatus 102, the driver may interact with the outdoor advertising apparatus 102, such as by gesturing or gazing. For example, the driver may point to the outdoor advertising apparatus 102, thereby indicating an interest in the contents or content related to that being displayed on the outdoor advertising apparatus 102. The driver's gesture may be observed and interpreted by an onboard system in the vehicle, such as an in-vehicle infotainment system (IVI). Based on the driver's action and the vehicle's telematics, the IVI may communicate with the outdoor advertising apparatus 102 that the driver pointed to, and obtain possible actions or additional information about the contents displayed on the outdoor advertising apparatus 102. Actions or information may be presented on the IVI or another screen in the vehicle (e.g., the driver's mobile phone or a wearable device worn by the driver or another occupant). Possible actions may include, but are not limited to contacting a party related to the contents displayed on the outdoor advertising apparatus 102, navigating to a website related to the party advertised on the outdoor advertising apparatus 102, storing a note regarding the contents of the outdoor advertising apparatus 102 in a local database for the driver to later reference, creating a navigation route for the driver based on the contents of the outdoor advertising apparatus 102, or requesting additional information related to the contents displayed on the outdoor advertising apparatus 102. The driver may interact with the IVI (or other device) to initiate the action.

The driver may initiate interaction with the outdoor advertising apparatus 102 in a number of ways, such as with a gesture (e.g., pointing), gazing at the outdoor advertising apparatus 102, or interacting with a device in the vehicle. For example, the driver may be equipped with a head-mounted wearable device (e.g., smartglasses), and stare (gaze) at the outdoor advertising apparatus 102 for longer than a threshold period (e.g., 3 seconds). This may act as a trigger to initiate interaction with the outdoor advertising apparatus 102.

As another example, the driver or another occupant may be prompted on a display device in the vehicle 104 of various outdoor advertising apparatus 102. The driver or occupant may select one, such as by touching an icon or other indicia on an in-dash display or other display in the vehicle 104 to initiate interaction.

As another example, the outdoor advertising apparatus 102 may monitor traffic and detect when a driver or occupant is pointing or gesturing to the outdoor advertising apparatus 102. In response, the outdoor advertising apparatus 102 may transmit options to the vehicle 104. As another example, the outdoor advertising apparatus 102 may monitor for when a driver or other occupant is looking at the outdoor advertising apparatus 102. Gaze tracking from the outdoor advertising apparatus 102 point-of-view may be achieved using cameras or other monitors. A person's gaze may be tracked such that after a threshold period, such as 5 seconds, the person is deemed to likely be interested in the advertising on the outdoor advertising apparatus 102. Communication may be initiated from the outdoor advertising apparatus 102 to the vehicle 104 occupied by the person. The vehicle 104 may be identified by a license plate, through wireless communication interrogation, or other mechanisms. Alternatively, the person may be recognized using facial recognition.

The vehicle 104 may be equipped with a location system (e.g., Global Positioning System (GPS) or GLONASS). Using the location system, the vehicle 104 is able to determine the location, direction of travel, and velocity. This information may be combined with a map of outdoor advertising apparatus 102 that have interactive systems and the analysis of the driver's gesture to determine a particular outdoor advertising apparatus 102. The driver's gesture may be detected by an onboard inward-facing camera installed on or in the vehicle 104.

In another mode, the vehicle 104 may receive broadcasted signals (e.g., beacon) from the outdoor advertising apparatus 102 as the vehicle 104 approaches. The information in the broadcasted signals may be filtered, processed, or otherwise examined to determine whether to present optional actions or information to an occupant of the vehicle 104 (e.g., via an IVI system).

In another mode, the vehicle 104 may have a planned route (e.g., a route from a navigation system in the IVI). The vehicle 104 may communicate with the outdoor advertising apparatus 102 or the advertising system 110 to obtain one or more sets of information related to outdoor advertising apparatus 102 along the route. The route may be used by the advertising system 110 to identify recommendations or suggestions to the driver, which may be related to outdoor advertising apparatus 102 along the route. Recommendations or suggestions may include options such as shopping venues, scenic outlooks, tourists stops, information kiosks, or the like, related to content on one or more outdoor advertising apparatus 102 along the route. Additionally, the advertising system 110 may push content related to outdoor advertising apparatus 102 identified as being on the route. The content may be large (e.g., several megabytes or gigabytes) such that transmitting such content to the vehicle 104 as it approaches the outdoor advertising apparatus 102 may be difficult or unfeasible. For example, an outdoor advertising apparatus 102 advertising a hotel may be identified as being along a route. A movie advertising some of the features or amenities of the hotel may be downloaded to the vehicle 104 in anticipation that the vehicle 104 may pass the outdoor advertising apparatus 102. When the vehicle 104 is detected as being near the outdoor advertising apparatus 102, such as with a location system (e.g., GPS or GLONASS), the movie may begin to play on the vehicle's system.

Some outdoor advertising apparatus 102 may have advertisements that rotate or change periodically. The advertising system 110 may be used to schedule the advertisements. The vehicle 104 may query the advertising system 110 to determine when an advertisement is scheduled to be displayed to synchronize the content shown to a person in the vehicle 104 with the advertisement being shown when the vehicle 104 is near or passing the outdoor advertising apparatus 102. This interaction may be used to synchronize in-vehicle content with the advertisement shown on the outdoor advertising apparatus 102 for any of the modes. For example, when a person points at the outdoor advertising apparatus 102 to indicate interest in the advertisement just before the advertisement is scheduled to change, the IVI may timestamp the person's gesture and then synchronize the gesture with the advertisement that was shown at the time of the gesture (e.g., by communicating with the outdoor advertising apparatus 102 or the advertising system 110).

Figure 2:
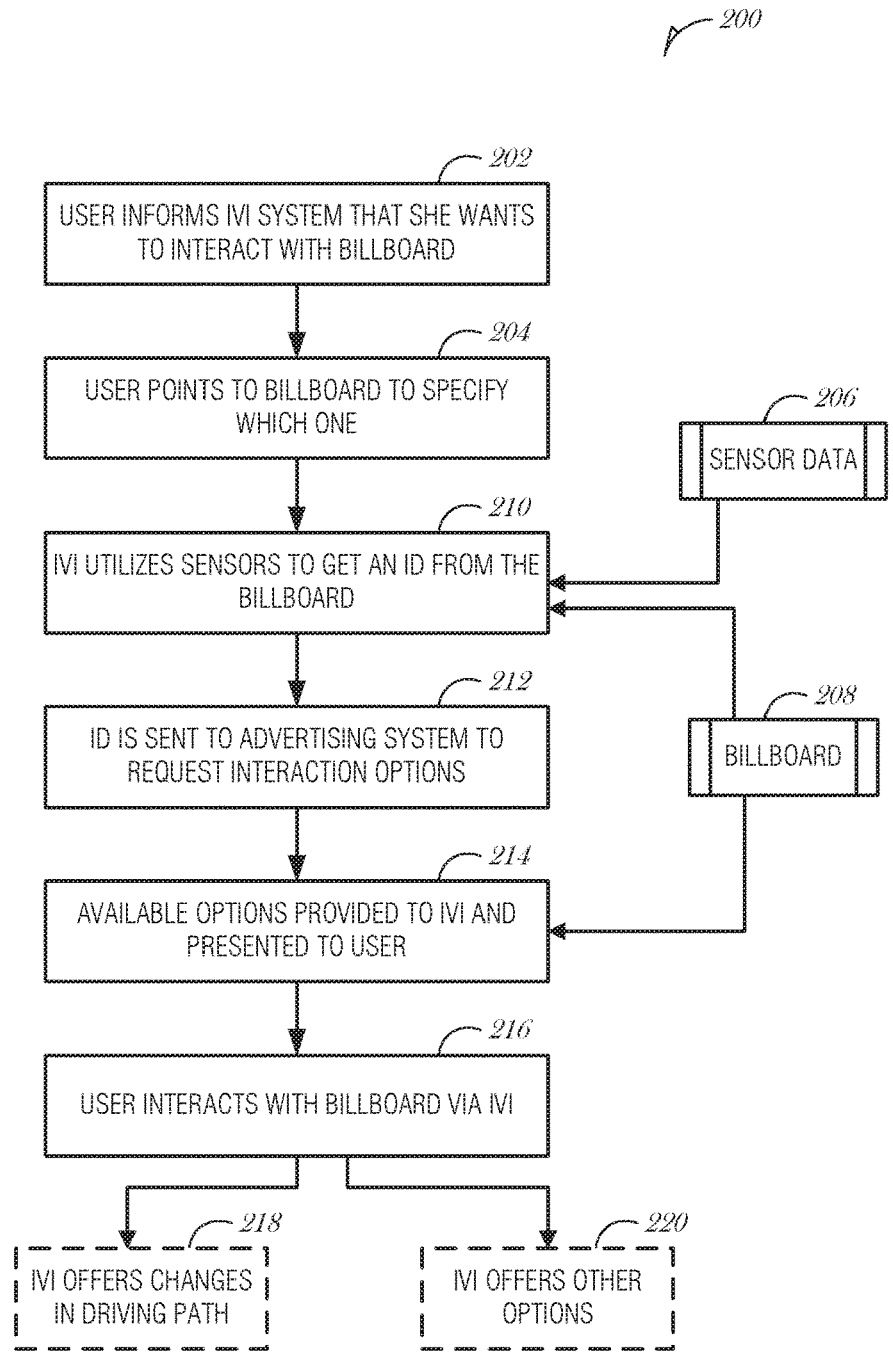
FIG. 2 is a flowchart illustrating process and control flow for interacting with digital signage, according to an embodiment.

FIG. 2 is a flowchart illustrating process and control flow 200 for interacting with digital signage, according to an embodiment. A user informs the IVI system that she wants to interact with a digital billboard (stage 202). The user points at the billboard to specify which billboard (stage 204). Using sensor data from the vehicle (item 206) and other data from the billboard (item 208), the IVI obtains an identification of the billboard (stage 210). The billboard identification may be a unique number, a public key, or other identification. The billboard identification may be encoded in a bar code (e.g., QR code) that is read from the billboard. The key is sent to an advertising system (stage 212) to request the interaction options. Interaction options may include, but are not limited to obtaining additional information related to the content of the billboard. (e.g., an address, a website, a price list, an inventory list, etc.), a mechanism to contact a person associated with the content of the billboard (e.g., to originate a phone call), or an option to initiate a navigation route to a location associated with the content. At stage 214, the available interaction options are transmitted to the IVI, which are then presented to the user. The user may then use the IVI to initiate additional interactions with the billboard (stage 216). The IVI may offer to create or change the navigation route (option 218) or additional interaction options (option 220).

Figure 3:
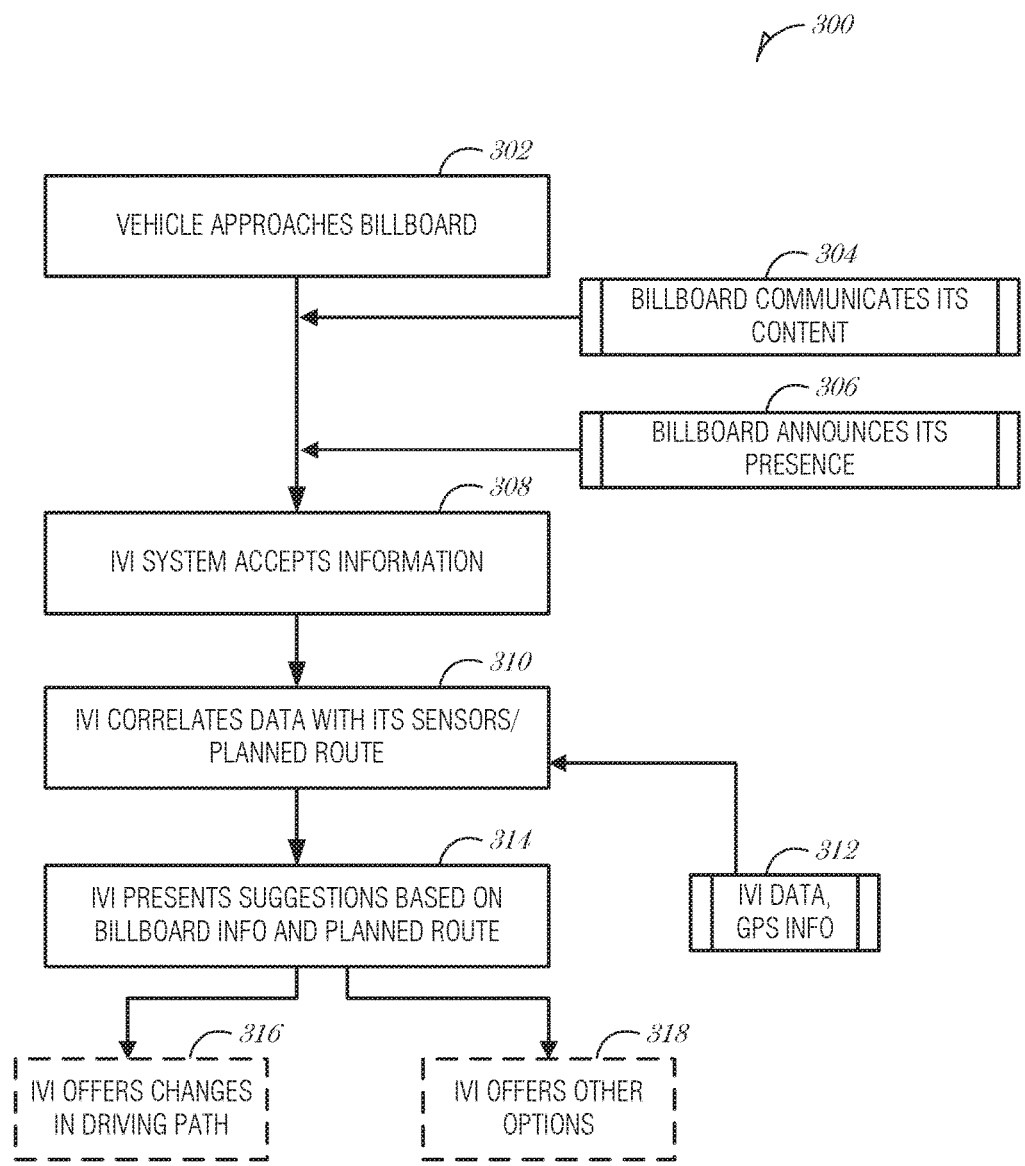
FIG. 3 is a flowchart illustrating process and control flow for interacting with digital signage, according to an embodiment.

FIG. 3 is a flowchart illustrating process and control flow 300 for interacting with digital signage, according to an embodiment. At stage 302, a vehicle approaches a billboard. The vehicle may have a planned route, in which case, the billboard may communicate its content (operation 304) in advance of when the vehicle is actually approaching the billboard (e.g., at the start of the trip). Depending on the size of the content, the billboard may communicate its content as the vehicle approaches (e.g., within 200 meters). The billboard may alternatively announce its presence (operation 306) as the vehicle approaches. For example, as the vehicle is moving in a certain direction, the location of the vehicle obtained by GPS, may be used to determine upcoming roadside billboards on the route. The billboard may broadcast a signal such that the IVI picks up the signal when it is within a certain distance from the billboard (e.g., a half a mile). The IVI may accept the information (stage 308). The IVI may then determine whether the billboard is likely interesting to an occupant of the vehicle (e.g., using a machine learning process) and continue interacting with the billboard based on the determination. At stage 310, the IVI correlates data with its sensors and any navigation route that is currently active. For example, the IVI may obtain GPS information, navigation route information, etc. (item 312) to determine where the vehicle is and where it is headed. This information may be useful to determine attraction, detours, or other route information to suggest to the driver. The IVI may present suggestions based on the billboard information and the planned route (stage 314). For example, a person driving past a digital sign for a fast food restaurant may be provided an option to create a detour in the navigation system to go to the restaurant (e.g., option 316) or call ahead to the restaurant to create a reservation (e.g., option 318) using an in-vehicle phone operated by the IVI.

Figure 4:
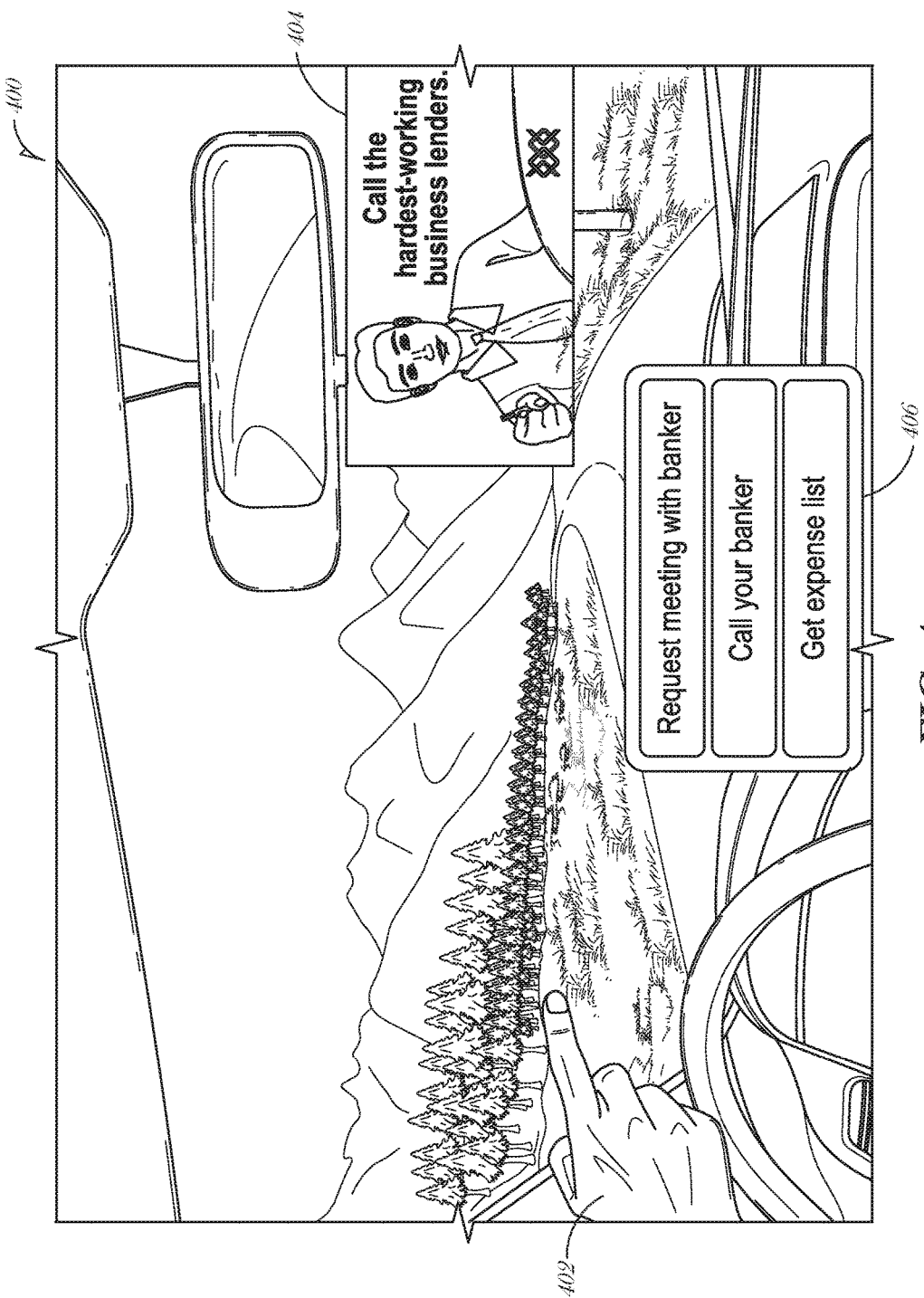
FIG. 4 illustrates a use case of interacting with digital signage, according to an embodiment.

FIG. 4 illustrates a use case of interacting with digital signage, according to an embodiment. A driver may gesture 402 to a digital signage 404. The gesture 402 indicates that the driver is interested in the contents of the digital signage 404. In response to the gesture 402, an IVI system 406 may query the digital signage 404 for more information. The IVI system 406 may present one or more options to the driver, where the options are related to the content of the digital signage 404. In this example, the digital signage 404 is advertising for a bank. The options presented on the IVI system 406 include an option to request a meeting with the banker in the advertisement, an option to call a current banker, and an option to obtain an expense list. Upon choosing the option to request a meeting with the banker, the IVI system 406 may dial the bank using a car phone or a mobile device coupled to the IVI system 406. Similarly, the option to call the current banker may initiate a phone call via the IVI system 406. The expense list may include details for various accounts (e.g., checking, savings, money market, etc.), home loan origination and fees, current savings or loan rates, overdraft fees, and the like. The expense list may be provided to an auxiliary device, such as the driver's mobile phone. Other options may be provided, such as directions or navigation to the closest branch.

Figure 5:
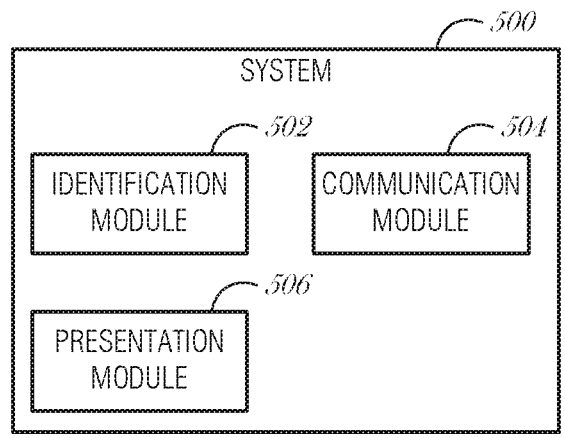
FIG. 5 is a block diagram illustrating a system for interacting with digital signage, according to an embodiment.

FIG. 5 is a block diagram illustrating a system 500 for interacting with digital signage, according to an embodiment. The system 500 includes an identification module 502, a communication module 504, and a presentation module 506.

The identification module 502 may be configured to identify, at an onboard system in a vehicle, a first roadside digital signage, the first roadside digital signage having first content.

The communication module 504 may be configured to receive a first option to perform a first action related to the first content.

The presentation module 506 may be configured to display the first option via the onboard system.

In an embodiment, to identify the first roadside digital signage, the identification module 502 is to receive an indication of a gesture of an occupant in the vehicle and determine that the gesture marks the first roadside digital signage. In a further embodiment, the gesture comprises a pointing action. In an embodiment, the identification module 502 is to query the first roadside digital signage marked by the gesture for an identification and receive the identification. The identification may be any type of locally or globally unique identifier, such as a public key. In an embodiment, to receive the first option to perform the first action related to the first content, the identification module 502 is to query a signage service with the identification for options available from the first digital signage identified by the identification and receive the options corresponding to the first digital signage from the signage service, the first option as one of the options. The signage service may solely manage digital signage or may offer additional advertising services, such as the advertising system 110.

In an embodiment, to identify the first roadside digital signage, the identification module 502 is to analyze a navigation route of the vehicle to identify a set of roadside digital signage along the navigation route and identify the first roadside digital signage as a member of the set of roadside digital signage along the navigation route.

In an embodiment, to identify the first roadside digital signage, the identification module 502 is to receive a beacon signal from the first roadside digital signage and obtain an identification of the first roadside digital signage from the beacon signal. The signal may be broadcast over any type of network, such as those described above with respect to network 108.

In an embodiment, the first option to perform the first action related to the first content includes one of: an option to contact a party associated with the content, an option to set a navigation route to travel to a location associated with the content, or an option to obtain additional information related to the content. It is understood that other options may be provided as well.

In an embodiment, to display the first option via the onboard system, the presentation module 506 is to display the first option via an in-dash display in the vehicle. In an embodiment, to display the first option via the onboard system, the presentation module 506 is to cause the display of the first option via a personal mobile device. The personal mobile device may be a wearable device, a mobile phone, a tablet computer, a laptop computer, or the like. In embodiments, the personal mobile device includes one of a smartphone, a wearable device, or a portable computer.

In an embodiment, the identification module 502 is to identify, at the onboard system in a vehicle, a second roadside digital signage, the second roadside digital signage located proximate to the first roadside digital signage and the second roadside digital signage having second content, where the communication module 504 is to receive an second option to perform a second action related to the second content, and where the presentation module 506 is to display the first option and the second option via the onboard system. For example, in some situations, multiple digital signage may be closely placed, perhaps even on the same billboard or mounting. In such an instance, the onboard system may obtain information from all signage in the proximate area and provide it to the user. The information may be displayed in various formats, such as with a list, in separate dialog boxes, on separate screens or pages, or the like. In an embodiment, to display the first option and the second option via the onboard system, the presentation module 506 is to display the first option and the second option in a scrollable list.

Figure 6:
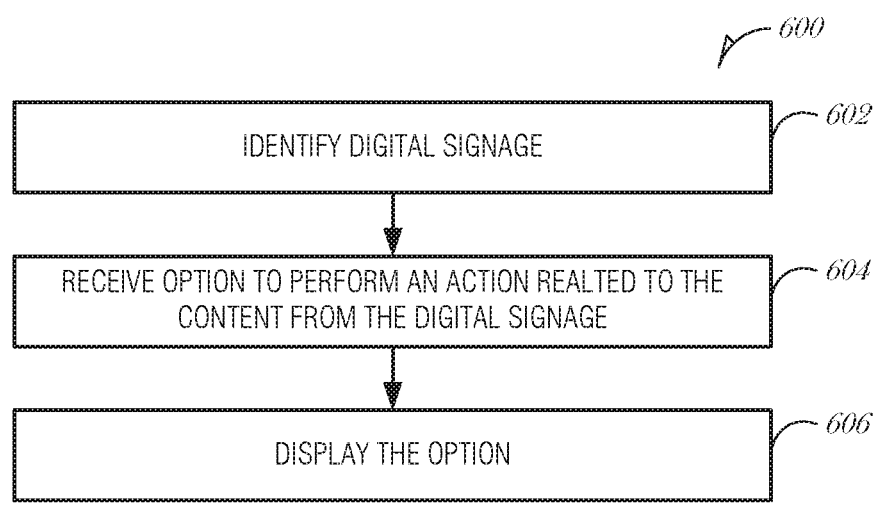
FIG. 6 is a flowchart illustrating a method of interacting with digital signage, according to an embodiment.

FIG. 6 is a flowchart illustrating a method 600 of interacting with digital signage, according to an embodiment. At block 602, a first roadside digital signage is identified at an onboard system in a vehicle, the first roadside digital signage having first content.

At block 604, a first option to perform a first action related to the first content is received.

At block 606, the first option is displayed via the onboard system.

In an embodiment, identifying the first roadside digital signage comprises receiving an indication of a gesture of an occupant in the vehicle and determining that the gesture marks the first roadside digital signage. In a further embodiment, the gesture comprises a pointing action. In a further embodiment, the method 600 includes querying the first roadside digital signage marked by the gesture for an identification and receiving the identification. In a further embodiment, receiving the first option to perform the first action related to the first content comprises querying a signage service with the identification for options available from the first digital signage identified by the identification and receiving the options corresponding to the first digital signage from the signage service, the first option as one of the options.

In an embodiment, identifying the first roadside digital signage comprises analyzing a navigation route of the vehicle to identify a set of roadside digital signage along the navigation route and identifying the first roadside digital signage as a member of the set of roadside digital signage along the navigation route.

In an embodiment, identifying the first roadside digital signage comprises receiving a beacon signal from the first roadside digital signage and obtaining an identification of the first roadside digital signage from the beacon signal.

In an embodiment, the first option to perform the first action related to the first content includes one of: an option to contact a party associated with the content, an option to set a navigation route to travel to a location associated with the content, or an option to obtain additional information related to the content.

In an embodiment, displaying the first option via the onboard system comprises displaying the first option via an in-dash display in the vehicle. In an embodiment, displaying the first option via, the onboard system comprises displaying the first option via a personal mobile device. In a further embodiment, the personal mobile device includes one of a smartphone, a wearable device, or a portable computer.

In an embodiment, the method 600 includes identifying, at the onboard system in a vehicle, a second roadside digital signage, the second roadside digital signage located proximate to the first roadside digital signage and the second roadside digital signage having second content; receiving an second option to perform a second action related to the second content; and displaying the first option and the second option via the onboard system. In a further embodiment, displaying the first option and the second option via the onboard system comprises displaying the first option and the second option in a scrollable list.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
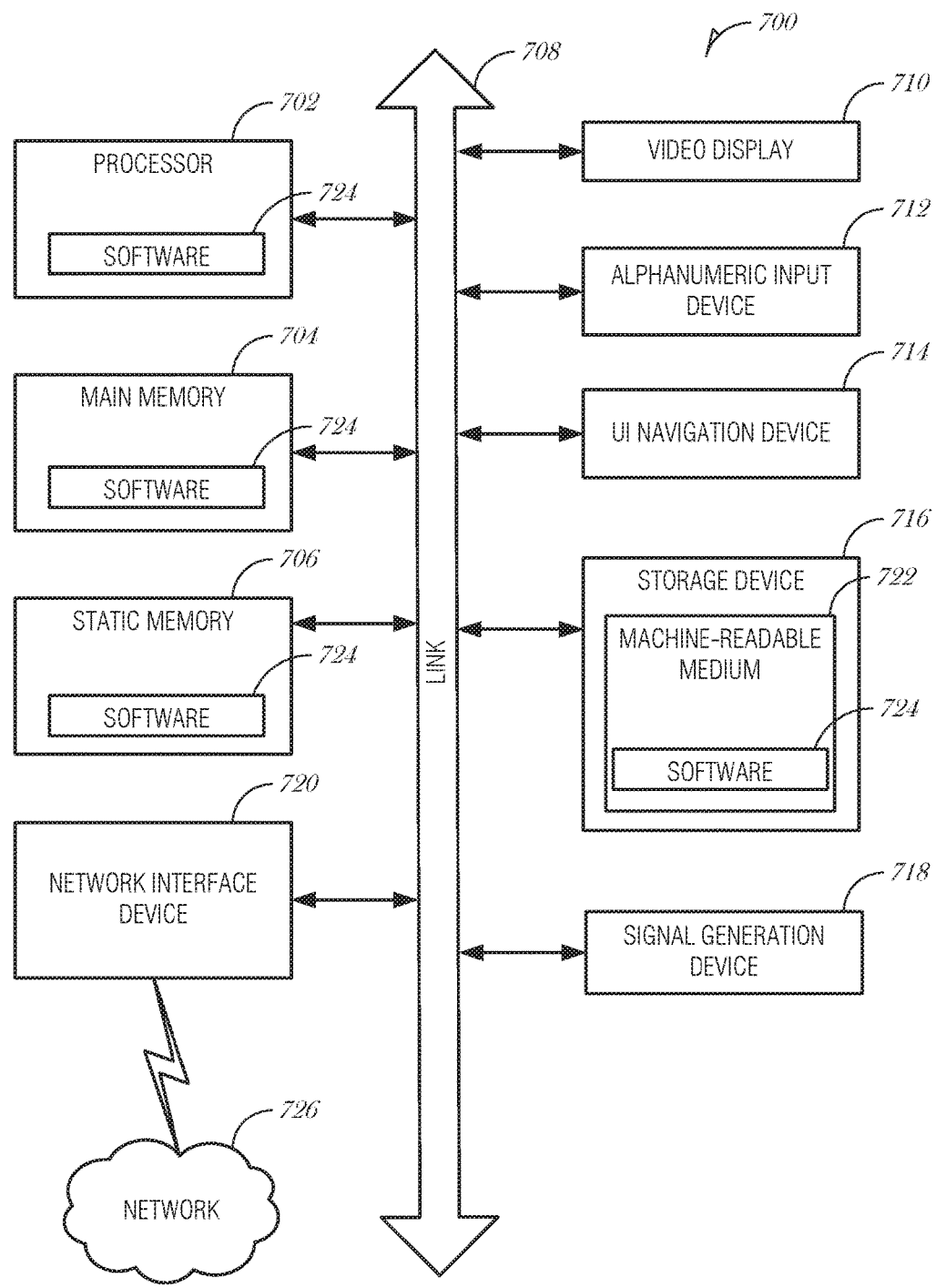
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, wireless data networks (e.g., Wi-Fi, 3G, and 4G LTE/LTE-A or WiMAX networks), and roadside gateways. The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) for interacting with digital signage comprising: an identification module to identify, at an onboard system in a vehicle, a first roadside digital signage, the first roadside digital signage having first content; a communication module to receive a first option to perform a first action related to the first content; and a presentation module to display the first option via the onboard system.

In Example 2, the subject matter of Example 1 may include, wherein to identify the first roadside digital signage, the identification module is to: receive an indication of a gesture of an occupant in the vehicle; and determine that the gesture marks the first roadside digital signage.

In Example 3, the subject matter of any one of Examples 1 to 2 may include, wherein the gesture comprises a pointing action.

In Example 4, the subject matter of any one of Examples 1 to 3 may include, wherein the identification module is to: query the first roadside digital signage marked by the gesture for an identification; and receive the identification.

In Example 5, the subject matter of any one of Examples 1 to 4 may include, wherein to receive the first option to perform the first action related to the first content, the identification module is to: query a signage service with the identification for options corresponding to the first digital signage identified by the identification; and receive the options corresponding to the first digital signage from the signage service, the first option as one of the options.

In Example 6, the subject matter of any one of Examples 1 to 5 may include, wherein to identify the first roadside digital signage, the identification module is to: analyze a navigation route of the vehicle to identify a set of roadside digital signage along the navigation route; and identify the first roadside digital signage as a member of the set of roadside digital signage along the navigation route.

In Example 7, the subject matter of any one of Examples 1 to 6 may include, wherein to identify the first roadside digital signage, the identification module is to: receive a beacon signal from the first roadside digital signage; and obtain an identification of the first roadside digital signage from the beacon signal.

In Example 8, the subject matter of any one of Examples 1 to 7 may include, wherein the first option to perform the first action related to the first content includes one of: an option to contact a party associated with the content, an option to set a navigation route to travel to a location associated with the content, or an option to obtain additional information related to the content.

In Example 9, the subject matter of any one of Examples 1 to 8 may include, wherein to display the first option via the onboard system, the presentation module is to: display the first option via an in-dash display in the vehicle.

In Example 10, the subject matter of any one of Examples 1 to 9 may include, wherein to display the first option via the onboard system, the presentation module is to: cause the display of the first option via a personal mobile device.

In Example 11, the subject matter of any one of Examples 1 to 10 may include, wherein the personal mobile device includes one of a smartphone, a wearable device, or a portable computer.

In Example 12, the subject matter of any one of Examples 1 to 11 may include, wherein the identification module is to identify, at the onboard system in a vehicle, a second roadside digital signage, the second roadside digital signage located proximate to the first roadside digital signage and the second roadside digital signage having second content; wherein the communication module is to receive an second option to perform a second action related to the second content; and wherein the presentation module is to display the first option and the second option via the onboard system.

In Example 13, the subject matter of any one of Examples 1 to 12 may include, wherein to display the first option and the second option via the onboard system, the presentation module is to: display the first option and the second option in a scrollable list.

Example 14 includes subject matter (such as a method, means for performing acts, machine readable medium including instructions that when performed by a machine cause the machine to performs acts, or an apparatus to perform) for interacting with digital signage comprising: identifying, at an onboard system in a vehicle, a first roadside digital signage, the first roadside digital signage having first content; receiving a first option to perform a first action related to the first content; and displaying the first option via the onboard system.

In Example 15, the subject matter of Example 14 may include, wherein identifying the first roadside digital signage comprises: receiving an indication of a gesture of an occupant in the vehicle; and determining that the gesture marks the first roadside digital signage.

In Example 16, the subject matter of any one of Examples 14 to 15 may include, wherein the gesture comprises a pointing action.

In Example 17, the subject matter of any one of Examples 14 to 16 may include, querying the first roadside digital signage marked by the gesture for an identification; and receiving the identification.

In Example 18, the subject matter of any one of Examples 14 to 17 may include, wherein receiving the first option to perform the first action related to the first content comprises: querying a signage service with the identification for options available from the first digital signage identified by the identification; and receiving the options corresponding to the first digital signage from the signage service, the first option as one of the options.

In Example 19, the subject matter of any one of Examples 14 to 18 may include, wherein identifying the first roadside digital signage comprises: analyzing a navigation route of the vehicle to identify a set of roadside digital signage along the navigation route; and identifying the first roadside digital signage as a member of the set of roadside digital signage along the navigation route.

In Example 20, the subject matter of any one of Examples 14 to 19 may include, wherein identifying the first roadside digital signage comprises: receiving a beacon signal from the first roadside digital signage; and obtaining an identification of the first roadside digital signage from the beacon signal.

In Example 21, the subject matter of any one of Examples 14 to 20 may include, wherein the first option to perform the first action related to the first content includes one of: an option to contact a party associated with the content, an option to set a navigation route to travel to a location associated with the content, or an option to obtain additional information related to the content.

In Example 22, the subject matter of any one of Examples 14 to 21 may include, wherein displaying the first option via the onboard system comprises: displaying the first option via an in-dash display in the vehicle.

In Example 23, the subject matter of any one of Examples 14 to 22 may include, wherein displaying the first option via the onboard system comprises: displaying the first option via a personal mobile device.

In Example 24, the subject matter of any one of Examples 14 to 23 may include, wherein the personal mobile device includes one of a smartphone, a wearable device, or a portable computer.

In Example 25, the subject matter of any one of Examples 14 to 24 may include, identifying, at the onboard system in a vehicle, a second roadside digital signage, the second roadside digital signage located proximate to the first roadside digital signage and the second roadside digital signage having second content; receiving an second option to perform a second action related to the second content; and displaying the first option and the second option via the onboard system.

In Example 26, the subject matter of any one of Examples 14 to 25 may include, wherein displaying the first option and the second option via the onboard system comprises: displaying the first option and the second option in a scrollable list.

Example 27 includes at least one machine-readable medium including instructions, which when executed by a machine, cause the machine to perform operations of any of the Examples 14-26.

Example 28 includes an apparatus comprising means for performing any of the Examples 14-26.

Example 29 includes subject matter (such as a device, apparatus, or machine) for interacting with digital signage comprising: means for identifying, at an onboard system in a vehicle, a first roadside digital signage, the first roadside digital signage having first content; means for receiving a first option to perform a first action related to the first content; and means for displaying the first option via the onboard system.

In Example 30, the subject matter of Example 29 may include, wherein the means for identifying the first roadside digital signage comprise: means for receiving an indication of a gesture of an occupant in the vehicle; and means for determining that the gesture marks the first roadside digital signage.

In Example 31, the subject matter of any one of Examples 29 to 30 may include, wherein the gesture comprises a pointing action.

In Example 32, the subject matter of any one of Examples 29 to 31 may include, means for querying the first roadside digital signage marked by the gesture for an identification; and means for receiving the identification.

In Example 33, the subject matter of any one of Examples 29 to 32 may include, wherein the means for receiving the first option to perform the first action related to the first content comprise: means for querying a signage service with the identification for options available from the first digital signage identified by the identification; and means for receiving the options corresponding to the first digital signage from the signage service, the first option as one of the options.

In Example 34, the subject matter of any one of Examples 29 to 33 may include, wherein the means for identifying the first roadside digital signage comprise: means for analyzing a navigation route of the vehicle to identify a set of roadside digital signage along the navigation route; and means for identifying the first roadside digital signage as a member of the set of roadside digital signage along the navigation route.

In Example 35, the subject matter of any one of Examples 29 to 34 may include, wherein the means for identifying the first roadside digital signage comprise: means for receiving a beacon signal from the first roadside digital signage; and means for obtaining an identification of the first roadside digital signage from the beacon signal.

In Example 36, the subject matter of any one of Examples 29 to 35 may include, wherein the first option to perform the first action related to the first content includes one of: an option to contact a party associated with the content, an option to set a navigation route to travel to a location associated with the content, or an option to obtain additional information related to the content.

In Example 37, the subject matter of any one of Examples 29 to 36 may include, wherein the means for displaying the first option via the onboard system comprise: means for displaying the first option via an in-dash display in the vehicle.

In Example 38, the subject matter of any one of Examples 29 to 37 may include, wherein the means for displaying the first option via the onboard system comprise: means for displaying the first option via a personal mobile device.

In Example 39, the subject matter of any one of Examples 29 to 38 may include, wherein the personal mobile device includes one of a smartphone, a wearable device, or a portable computer.

In Example 40, the subject matter of any one of Examples 29 to 39 may include, means for identifying, at the onboard system in a vehicle, a second roadside digital signage, the second roadside digital signage located proximate to the first roadside digital signage and the second roadside digital signage having second content; means for receiving an second option to perform a second action related to the second content; and means for displaying the first option and the second option via the onboard system.

In Example 41, the subject matter of any one of Examples 29 to 40 may include, wherein the means for displaying the first option and the second option via the onboard system comprise: means for displaying the first option and the second option in a scrollable list.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated references) are supplementary to that of this document for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for interacting with a roadside display, the system comprising:
    a hardware processor; and
    a memory comprising instructions which, when executed by the processor, cause the system to:
        identify, at an onboard system in a vehicle heading toward a first roadside display, the first roadside display including a first content;
        receive the first content, at the onboard system from the first roadside display, as a result of the first roadside display determining, based on a size of the first content and a distance between the vehicle and the roadside display, that transmitting the first content to the vehicle can be performed before the vehicle reaches the first roadside display;
        receive a first option to perform a first action related to the first content; and
        display the first option via the onboard system.

2. The system of claim 1, wherein to identify the first roadside display, the system further comprises instructions which, when executed by the hardware processor, cause the system to:
    receive an indication of a gesture of an occupant in the vehicle; and
    determine that the gesture marks the first roadside display.

3. The system of claim 2, wherein the gesture comprises a pointing action.

4. The system of claim 2, further comprising instructions which, when executed by the hardware processor, cause the system to:
query the first roadside display marked by the gesture for an identification; and
receive the identification.

5. The system of claim 4, wherein to receive the first option to perform the first action related to the first content, the system further comprises instructions which, when executed by the hardware processor, cause the system to:
query a signage service with the identification for options corresponding to the first display identified by the identification; and
receive the options corresponding to the first display from the signage service, the first option as one of the options.

6. The system of claim 1, wherein to identify the first roadside display, the system further comprises instructions which, when executed by the hardware processor, cause the system to:
receive a beacon signal from the first roadside display; and
obtain an identification of the first roadside display from the beacon signal.

7. The system of claim 1, wherein the first option to perform the first action related to the first content includes one of:
an option to contact a party associated with the first content, an option to set a navigation route to travel to a location associated with the first content, or an option to obtain additional information related to the first content.

8. The system of claim 1, wherein to display the first option via the onboard system, the system further comprises instructions which, when executed by the hardware processor, cause the system to display the first option via an in-dash display in the vehicle.

9. The system of claim 1, wherein to display the first option via the onboard system, the system further comprises instructions which, when executed by the hardware processor, cause the system to cause the display of the first option via a personal mobile device.

10. The system of claim 9, wherein the personal mobile device comprises one of a smartphone, a wearable device, or a portable computer.

11. The system of claim 1, further comprising instructions which, when executed by the hardware processor, cause the system to:
identify, at the onboard system in the vehicle, a second roadside display, the second roadside display located proximate to the first roadside display and the second roadside display having second content;
receive a second option to perform a second action related to the second content; and
display the first option and the second option via the onboard system.

12. The system of claim 11, wherein to display the first option and the second option via the onboard system, the system further comprises instructions which, when executed by the hardware processor, cause the system to display the first option and the second option in a scrollable list.

13. A method of interacting with a roadside display, the method comprising:
identifying, at an onboard system in a vehicle heading toward a first roadside display, the first roadside display including a first content;
receiving the first content, at the onboard system from the first roadside display, as a result of the first roadside display determining, based on a size of the first content and a distance between the vehicle and the roadside display, that transmitting the first content to the vehicle can be performed before the vehicle reaches the first roadside display;
receiving a first option to perform a first action related to the first content; and
displaying the first option via the onboard system.

14. The method of claim 13, wherein identifying the first roadside display comprises:
receiving an indication of a gesture of an occupant in the vehicle; and
determining that the gesture marks the first roadside display.

15. The method of claim 14, wherein the gesture comprises a pointing action.

16. The method of claim 14, further comprising:
querying the first roadside display marked by the gesture for an identification; and
receiving the identification.

17. The method of claim 16, wherein receiving the first option to perform the first action related to the first content comprises:
querying a signage service with the identification for options available from the first display identified by the identification; and
receiving the options corresponding to the first display from the signage service, the first option as one of the options.

18. The method of claim 13, wherein identifying the first roadside display comprises:
receiving a beacon signal from the first roadside display; and
obtaining an identification of the first roadside display from the beacon signal.

19. The method of claim 13, wherein the first option to perform the first action related to the first content includes one of:
an option to contact a party associated with the first content, an option to set a navigation route to travel to a location associated with the first content, or an option to obtain additional information related to the first content.

20. At least one non-transitory machine-readable medium including instructions for interacting with a display, which when executed by a machine, cause the machine to:
identify, at an onboard system in a vehicle heading toward a first roadside display, the first roadside display including a first content;
receive the first content, at the onboard system from the first roadside display, as a result of the first roadside display determining, based on a size of the first content and a distance between the vehicle and the roadside display, that transmitting the first content to the vehicle can be performed before the vehicle reaches the first roadside display;
receive a first option to perform a first action related to the first content; and
displaying the first option via the onboard system.

21. The at least one machine-readable medium of claim 20, wherein the instructions to display the first option via the onboard system comprise instructions to:
display the first option via an in-dash display in the vehicle.

22. The at least one machine-readable medium of claim 20, wherein the instructions to displaying the first option via the onboard system comprise instructions to:
 display the first option via a personal mobile device.

23. The at least one machine-readable medium of claim 20, further comprising instructions to:
 identify, at the onboard system in the vehicle, a second roadside display, the second roadside display located proximate to the first roadside display and the second roadside display having second content;
 receive a second option to perform a second action related to the second content; and
 display the first option and the second option via the onboard system.

\* \* \* \* \*